United States Patent
Zhan et al.

(10) Patent No.: US 11,485,688 B2
(45) Date of Patent: Nov. 1, 2022

(54) NANO MODIFIED SILICATE CAPILLARY CRYSTALLINE MATERIAL AND USE METHOD THEREOF

(71) Applicant: Yangdong Zhan, Beijing (CN)

(72) Inventors: Yangdong Zhan, Beijing (CN); Yoshihisa Suzuki, Beijing (CN)

(73) Assignee: Yangdong Zhan, Beijing (CN)

( * ) Notice: Subject to any disclaimer, the term of this patent is extended or adjusted under 35 U.S.C. 154(b) by 0 days.

(21) Appl. No.: 17/434,393

(22) PCT Filed: Apr. 27, 2020

(86) PCT No.: PCT/CN2020/000090
§ 371 (c)(1),
(2) Date: Aug. 26, 2021

(87) PCT Pub. No.: WO2020/173220
PCT Pub. Date: Sep. 3, 2020

(65) Prior Publication Data
US 2022/0041518 A1 Feb. 10, 2022

(30) Foreign Application Priority Data

Feb. 27, 2019 (CN) .......................... 201910146232.0

(51) Int. Cl.
| | | |
|---|---|---|
| *C04B 41/45* | (2006.01) | |
| *C04B 41/50* | (2006.01) | |
| *C04B 40/06* | (2006.01) | |
| *C04B 28/26* | (2006.01) | |
| *C04B 14/04* | (2006.01) | |

(52) U.S. Cl.
CPC .......... *C04B 41/4543* (2013.01); *C04B 14/04* (2013.01); *C04B 40/0658* (2013.01); *C04B 40/0683* (2013.01); *C04B 41/5024* (2013.01)

(58) Field of Classification Search
CPC . C04B 41/4543; C04B 41/5024; C04B 14/04; C04B 40/0658; C04B 40/0683
See application file for complete search history.

(56) References Cited

U.S. PATENT DOCUMENTS

2006/0054053 A1*  3/2006  Masutani ................ C09D 5/00
                                                       525/50
2018/0037767 A1*  2/2018  Zhang .................... C11D 3/162

FOREIGN PATENT DOCUMENTS

| CN | 102645856 A | * | 8/2012 | |
|---|---|---|---|---|
| CN | 106904928 A | * | 6/2017 | ............ C04B 28/26 |
| CN | 106904928 A | | 6/2017 | |
| CN | 109336531 A | | 2/2019 | |

OTHER PUBLICATIONS

Notice to Grant issued in corresponding Chinese Application No. 201910146232.0; dated Dec. 2, 2019; 3 pgs.
First Office Action issued in corresponding Chinese Application No. 201910146232.0; dated Aug. 26, 2019; 15 pgs.
Search Report issued in corresponding Chinese Application No. 201910146232.0; dated Aug. 15, 2019; 2 pgs.
International Search Report issued in corresponding International Application No. PCT/CN2020/000090; dated Jul. 24, 2020; China National Intellectual Property Administration; Beijing, China; 7 pgs.
Written Opinion issued in corresponding International Application No. PCT/CN2020/000090; dated Jul. 24, 2020; China National Intellectual Property Administration; Beijing, China; 7 pgs.

* cited by examiner

*Primary Examiner* — Alex B Efta
(74) *Attorney, Agent, or Firm* — Hauptman Ham, LLP

(57) ABSTRACT

A concrete durability protection method is provided, including following steps: Step one: rinsing the concrete surface; Step two: spraying agent A material or alternately spraying agent B material and agent A material at the wet surface of the concrete; Step three: repeating step two. The beneficial effects of the present invention include: nanoscale active silicate penetrates into the concrete surface layer within a certain depth and reacts with free calcium ions within the concrete to form C—S—H crystalline, thereby improving the compactness of the concrete surface layer within a certain depth, repairing defects in the concrete surface layer within a certain depth, such as the capillary interstices, pores, microcracks, etc., so as to effectively improve the durability of concrete. The unreacted nanoscale active silicate material has permanent activity. It could recover its activity when the concrete absorbs moisture, and continue to react with free calcium ions in the concrete to quickly form C—S—H crystals, realizing the permanent concrete durability protection.

11 Claims, No Drawings

NANO MODIFIED SILICATE CAPILLARY CRYSTALLINE MATERIAL AND USE METHOD THEREOF

RELATED APPLICATIONS

The present application is a U.S. National Phase of International Application Number PCT/CN2020/000090, filed Apr. 27, 2020, and claims priority of the Chinese Patent Application No. 201910146232.0, entitled "A nano-modified silicate capillary crystalline material and the use method thereof" filed on Feb. 27, 2019.

TECHNICAL FIELD

The invention relates to the technical field of inorganic concrete durability protection and repair materials. Particularly, it involves a nano-modified silicate capillary crystalline material and the use method thereof.

TECHNICAL BACKGROUND

The past 30 years have seen a rapid economic development in China, as well as rapid development of infrastructure construction and key projects in various fields, such as municipal construction projects, transportation bridges and tunnels, hydropower dam projects, port projects, etc. As the country's urbanization is largely completed, the peak period of major construction in China has passed and it is at the late stage of massive construction, however concrete is still the main construction material. According to statistics, there are about 72.41 billion m2 (779.4 billion square foot) existing concrete buildings in China, and about 29.58 billion m2 (318.4 billion square foot) has been used for more than 30 years, accounting for 40% of existing concrete buildings. The number of existing highway bridges has exceeded 800,000, and more than 250,000 bridges has been used for over 30 years. There are more than 86,000 hydropower reservoir dams, and about 70% of them have been constructed for more than or close to 30 years.

Due to a variety of reasons, the life of concrete contractions has begun to be seriously threatened because of the durability of concrete materials, and prominent problems have begun to appear. China gradually attaches importance to the durability protection of concrete construction in various fields and plans to establish research projects to explore high-performance concrete durability protection materials and techniques through professional research institutes and universities or introduce world-class advanced new concrete durability protection materials. Therefore, the new high-performance concrete durability protection and repair material is one of the important technological development directions with massive market demand and strong government support in the next ten years, which has considerable direct economic value and indirect social value.

Currently, there are two main aspects to improve the concrete durability in Chinese market: on one hand, the problem can be solved by improving the concrete material itself, mainly involving the optimization of concrete raw materials, the optimization of concrete mix ratio, the technology of adding powder to concrete, the development of concrete admixture technology, and the improvement of concrete pouring construction technology; on the other hand, the problem can be solved by concrete surface protection technology, mainly involving the application of epoxy resin coating materials, polyurea resin coatings, polyurethane coatings, acrylic emulsion coatings, cement-based capillary crystalline waterproof materials, etc. As far as the second aspect concerned, in the field of concrete durability protection material technology, current approaches have serious technical problems of aging and nondurability in both the protective material per se and the combination of the protective material and the concrete. Therefore, there is no better technology for concrete protection so far.

However, the concrete protection and repair technology using inorganic water-based nano-modified silicate capillary crystallized with permanent activity is a new type of environmental protective method that has been rapidly developed in Europe, America and Japan in the past decade. It is integrated with the concrete body and improves durability of concrete. It is fundamentally different from the traditional protective material that only "wearing one coat" on the concrete surface.

CONTENT OF INVENTION

This invention overcomes the shortcomings in the current application and provides a nano-modified silicate capillary crystalline material and its spraying method.

The purpose of this invention can be achieved through the following technical solutions. A concrete durability protection method includes following steps:
the first step, rinsing the concrete surface;
the second step, spraying agent A material on the wet concrete surface or alternatively spraying agent B and agent A material;
said agent A material consisting of: 5-30 portions of sodium silicate, 5-20 portions of potassium silicate, 0.05-0.5 portions of surfactant, 0.1-1 portions of reaction retarder, 0.1-0.5 portions of reductant, 0.1-2 portions of reaction accelerator, 0.01-0.5 portions of anti-freezing auxiliary, 0.1-1 portions of metal ion blocking auxiliary, 0.1-1 portions of surface enhancer, 0.1-0.5 portions of antirusting agent, and 40-70 portions of deionized water;
said agent B material consisting of: 5-30 portions of calcium hydroxide, 0.05-1 portions of surfactant, 5-30 portions of sodium hydroxide, and 40-80 portions of deionized water.

Further, said spraying in the second step includes: step one, spraying the agent A material; step two, spraying the agent A material a second time after the agent A material in the step one is dried.

Further, said spraying in the second step includes: step one, spraying agent B material; step two, spraying agent A material after said agent B material in the step one is dried on the concrete surface; step three, repeating step one and step two.

Further, said surfactant of agent A material is any of primary alcohol, secondary alcohol, dodecyl trimethyl ammonium chloride, imidazolines, polyoxyethylene tridecyl ether, or castor oil polyoxyethylene ether ester.

Further, said reaction retarder of agent A material is any of borate, sodium hydroxide or potassium hydroxide.

Further, said reductant of agent A material is thionuric acid or sodium thiosulfate inorganic ion reductant.

Further, said reaction accelerator of agent A material is any kind of inorganic halide salts ionic liquid or citrate ions.

Further, said anti-freezing auxiliary of agent A material is carbonates.

Further, said metal ion blocking auxiliary of agent A material is sodium metaphosphate.

Further, said surface enhancer of the agent A material is magnesium fluoride or magnesium chloride.

Further, said antirusting agent of agent A material is diamino silver complex or alkamine alkali metal.

Further, said surfactant of agent B material is triethanolamine.

A nano-modified silicate capillary crystalline material, which is composed of agent A and agent B, wherein the portions of each component of the agent A material are: 5-30 portions of sodium silicate, 5-20 portions of potassium silicate, 0.05-0.5 portions of surfactant, 0.1-1 portions of reaction retarder, 0.1-0.5 portions of reductant, 0.1-2 portions of reaction accelerator, 0.01-0.5 portions of antifreezing auxiliary, 0.1-1 portions of metal ion blocking auxiliary, 0.1-1 portions of surface enhancer, 0.1-0.5 portions of antirusting agent, and 40-70 portions of deionized water; the portions of each component of the agent B material are: 5-30 portions of calcium hydroxide, 0.05-1 portions of surfactant, 5-30 portions of sodium hydroxide, and 40-80 portions of deionized water.

Further, said surfactant of agent A material is any of primary alcohol, secondary alcohol, dodecyl trimethyl ammonium chloride, imidazolines, polyoxyethylene tridecyl ether, or castor oil polyoxyethylene ether ester.

Further, said reaction retarder of agent A material is any of borate, sodium hydroxide or potassium hydroxide.

Further, said reductant of agent A material is thionuric acid or sodium thiosulfate inorganic ion reductant.

Further, said reaction accelerator of agent A material is any kind of inorganic halide salts ionic liquid or citrate ions.

Further, said anti-freezing auxiliary of agent A material is carbonates.

Further, said metal ion blocking auxiliary of agent A material is sodium metaphosphate.

Further, said surface enhancer of agent A material is magnesium fluoride or magnesium chloride.

Further, said antirusting agent of agent A material is diamino silver complex or alkamine alkali metal.

Further, said surfactant of agent B material is triethanolamine.

The beneficial effect of the present invention is that an inorganic water-based nano-modified silicate solution penetrates into a certain depth of the concrete surface, crystallizing and consolidating to form C—S—H, which fills pores and capillary pores on the concrete surface, thereby improving the long-term durability of concrete.

After this inorganic nano-modified silicate solution penetrates into certain depth of the concrete surface, some of the active particles react with the "calcium ions" inside the concrete to form C—S—H gel crystals, and the unreacted active particles stay in concrete pores or capillary pores after the water volatilization. Once any new pores or capillary pores occur around these particles, the unreacted active particles can dissolve again after encountering external water and continue to react with the "calcium ions" inside the concrete to form C—S—H gel crystals, filling these new pores or capillary pores to improve the compactness and strength of concrete, thereby increasing the durability of concrete.

Therefore, in the case of micro-cracks growing inside the concrete constructions due to various reasons, it can be realized that the unreacted active nano-modified silicate substances retained in the concrete can continue to interact with nearby free calcium ions to form C—S—H crystals, quickly filling up the micro-cracks and restoring the integrity of the concrete, thereby avoiding the durability problems of the concrete deterioration caused by the defect of micro-cracks growing into large cracks or calcium dissolution in the leakage water effectuated by cracks.

The agent A material is a nano-modified silicate composite solution, and the agent B material is a nano-modified complex calcium ion solution. For the new concrete durability protection, just spray agent A material, while for used concrete which has already showed some durability problems, it is necessary to use agent B material and agent A material together in order to provide free calcium ions lacking in the used concrete, therefore promoting the effective reaction of the agent A material after penetration.

DESCRIPTION OF EMBODIMENTS

Hereinafter, the technical solution of the present invention is further illustrated with reference to the embodiments.

The waterproofing and durability protection method applied on a new concrete building adopts the following steps: firstly, rinse the surface of concrete with high-pressure water; when the surface of concrete is in a wet state, spray the agent A material for the first time at 200-300 ml/m$^2$; when the surface of concrete is substantially dry after the first spraying, spray the agent A material for the second time at 100-200 ml/m$^2$. 24 hours after the second spraying, the surface of concrete doesn't need further special maintenance and protection, such as raining, impounding, etc., thus the effective waterproofing and durability protection is completed for the surface of concrete building.

The durability protection method applied on a used concrete building adopts the following steps: firstly, rinse the surface of concrete with high-pressure water; when the surface of concrete is in a wet state, spray the agent B material for the first time at 250 ml/m$^2$; when the surface of concrete is substantially dry after the first spraying of the agent B, spray the agent A material for the first time at 250 ml/m$^2$; when the surface of concrete is dry after the first spraying of agent A, spray the agent B material for the second time; When the surface of concrete is dry after the second spraying of agent B, spray the agent A material for the second time. Then after 24 hours, the concrete surface doesn't need further special maintenance and protection, such as raining, impounding, etc. thus the effective waterproofing and durability protection is completed for the surface of used concrete building.

For the used concrete that has internally deteriorated due to durability problems caused by carbonization, calcium dissolution in leakage water of cracks, or new micro-cracks raised by freeze-thaw damage, the supporting agent B material can provide an alkaline calcium ion complex which can penetrate into the concrete to increase the effective free calcium ion, so that when the inorganic water-based nano-modified silicate solution penetrates into the concrete, it wouldn't fail to react and generate C—S—H crystalline due to the lack of free calcium in the deteriorated old concrete and lose the expected performance. Therefore, spraying agent B material first and then agent A can effectively improve the surface compactness of the deteriorated concrete within a certain depth (at least 40 mm (1.57 inch)), improve waterproofness, restore and increase the strength of the surface, thereby improving the service life of the used concrete.

Both above methods do not need to dry the concrete surface before spraying, nor do it need to wet and maintain the concrete after spraying, thus the process is fairly convenient.

In order to achieve the above objective, the present invention provides a nano-modified silicate capillary crystalline material, which includes two materials: agent A and agent B, in which:

Said agent A consists of 5-30 portions of sodium silicate, 5-20 portions of potassium silicate, 0.05-0.5 portions of surfactant, 0.1-1 portions of reaction retarder, 0.1-0.5 portions of reductant, 0.1-2 portions of reaction accelerator, 0.01-0.5 portions of anti-freezing auxiliary, 0.1-1 portions of metal ion blocking auxiliary, 0.1-1 portions of surface enhancer, 0.1-0.5 portions of antirusting agent, and 40-70 portions of deionized water. The agent B consists by weight of: 5-30 portions of calcium hydroxide, 0.05-1 portions of surfactant, 5-30 portions of sodium hydroxide, and 40-80 portions of deionized water.

Further, said surfactant of agent A material is preferably any of primary alcohol, secondary alcohol, dodecyl trimethyl ammonium chloride, imidazolines, polyoxyethylene tridecyl ether, or castor oil polyoxyethylene ether ester, wherein the primary alcohol and secondary alcohol are preferably ethyl alcohol or isobutyl alcohol.

Further, said reaction retarder of agent A material is preferably any of borate, sodium hydroxide or potassium hydroxide.

Further, said reductant of agent A material is preferably thionuric acid or sodium thiosulfate inorganic ion reductant.

Further, said reaction accelerator of agent A material is any kind of inorganic halide salts ionic liquid or citrate ions, wherein the inorganic halide salt ionic liquid is preferably ammonium chloride, ammonium fluoride or sodium chloride.

Further, said anti-freezing auxiliary of agent A material is carbonates, preferably sodium carbonate or potassium carbonate.

Further, said metal ion blocking auxiliary of agent A material is sodium metaphosphate.

Further, said surface enhancer of agent A material is magnesium fluoride or magnesium chloride.

Further, said antirusting agent of agent A material is diamino silver complex or alkamine alkali metal. The agent B contains 5-30 portions of alkaline calcium ion complex, 0.05-1 portions of surfactant, 5-30 portions of sodium hydroxide and 40-70 portions of deionized water. Said surfactant in the agent B is triethanolamine.

EXAMPLE 1

Preparation of agent A: weigh 0.07 portions of dodecyl trimethyl ammonium chloride, 0.15 portions of sodium borate, 0.3 portions of sodium thiosulfate, 0.15 portions of ammonium chloride, 0.2 portions of potassium carbonate, 0.15 portions of sodium metaphosphate, 0.15 portions of magnesium fluoride, 0.35 portions of sodium amino alcohol, 60 portions of deionized water, etc., mix and stir in a high-speed shearing kettle at 1000-2000 rpm, add 23 portions of sodium silicate solution and 15 portions of potassium silicate solution while stirring at high speed, until the addition is complete and the mixed solution is in a completely transparent and uniform liquid state.

The agent A material in the present invention is a completely transparent and uniform liquid, which truly realizes nano-scale dispersion. The viscosity is all less than 5 mP·s, which is close to 1 mP·s of water. The particles are active and have excellent capillary permeability. It would contribute to the convenience of construction process and reliability of application effects, and effectively improve the comprehensive durability of concrete.

After the inorganic water-based nano-modified silicate capillary crystalline repairing material agent A for protecting the water-proofing and durability of concrete prepared in this example is applied to the new concrete (no obvious durability problems, such as whitening, yellowing, fine cracks, pulp peeling off of the surface, ember rusting water spilling from the surface, etc.) for surface protection, the concrete durability changes as follows:

TABLE 1

Comparation of durability parameters of a new concrete building before and after the application of agent A material prepared in Example 1

| Test factors | | Performance before applying agent A material | Performance after applying agent A material |
| --- | --- | --- | --- |
| Compressive strength | 49 days | 25.6 | 26.9 |
| | 90 days | 36.1 | 39.8 |
| | 180 days | 39.2 | 44.6 |
| Impermeability level | | W6 | W10 |
| Shrinkage rate (28 d, ×10$^{-6}$) | | −316 | −243 |
| Carbonization depth (28 d, mm(inch)) | | 18 (0.71) | 10 (0.39) |
| Resistance depth of chlondion penetration (C) | | 2803 | 2020 |
| Antifreeze grade (After 50 times of freeze-thaw cycle) | Relative dynamic modulus (%) | 57 | 79 |
| | Mass loss rate (%) | 1.420 | 0.4 |
| Antifreeze grade (After 75 times of freeze-thaw cycle) | Relative dynamic modulus (%) | 34 | 61 |
| | Mass loss rate (%) | 5.69 | 1.68 |

From Table 1 above, it can be inferred that after the application of agent A material, the surface compressive strength of concrete increases by more than 10% at 90-day age and 29% at 180-day age, indicating that the use of agent A material improves the compactness of the concrete surface. Therefore, the compressive strength is greatly improved. The 28 d shrinkage is reduced by more than 23%, which greatly improves the early volume stability of the concrete, effectively avoiding the generation of fine cracks due to the early shrinkage of the concrete, and greatly improves the future durability of the concrete. After using the agent A material, the carbonization depth is reduced by about 50%, and the chloridion penetration depth is reduced by about 50%, both of which directly improve the resistance of the concrete to carbonation erosion and reduce the possibility of corrosion of the steel structure in the concrete caused by chloridion penetration. According to China national and industry standards, the freeze-thaw resistance is evaluated on the basis of a mass loss rate of less than 5% and a relative dynamic modulus of no less than 50%. The anti-freeze performance is greatly improved after the use of agent A material, and the resistance times of freeze-thaw damage is raised by one level.

EXAMPLE 2

Preparation of agent A material: weigh 0.05 portions of dodecyl trimethyl ammonium chloride, 0.10 portions of sodium borate, 0.1 portions of sodium thiosulfate, 0.10 portions of ammonium chloride, 0.15 portions of potassium carbonate, 0.10 portions of sodium metaphosphate, 0.10 portions of magnesium fluoride, 0.15 portions of sodium amino alcohol, and 60 portions of deionized water, etc., mix and stir in a high-speed shearing kettle at 1000-2000 rpm, and add 20 portions of sodium silicate solution and 18 portions of potassium silicate solution while stirring at high speed, until the addition is complete and the mixed solution is in completely transparent and uniform liquid state.

After the inorganic water-based nano-modified silicate capillary crystalline repairing material agent A for protecting the water-proofing and durability of concrete prepared in this example is applied to new concrete (no obvious durability problems, such as whitening, yellowing, fine cracks, pulp peeling off of the surface, ember rusting water spilling from the surface, etc.) for surface protection, the concrete durability changes as follows:

TABLE 2

Comparison of durability parameters of a new concrete building before and after the application of agent A material prepared in Example 2

| Test Factors | | Performance before applying agent A and B material | Performance after applying agent A and B material |
|---|---|---|---|
| Compressive strength | 28 days | 26.8 | 28.9 |
| | 90 days | 35.1 | 38.7 |
| | 180 days | 38.2 | 48.2 |
| Impermeability level | | W6 | W11 |
| Carbonization depth ( 28 d , mm(inch) ) | | 17 (0.67) | 9 (0.35) |
| Resistance depth of chloridion penetration ( C ) | | 2868 | 1980 |
| Antifreeze grade of core sample ( 50 times of freeze-thaw cycle ) | Relative dynamic modulus ( % ) | 51 | 69 |
| | Mass loss rate ( % ) | 3.62 | 0.38 |
| Antifreeze grade of core sample ( 75 times of freeze-thaw cycle ) | Relative dynamic modulus ( % ) | 31 | 64 |
| | Mass loss rate ( % ) | 5.39 | 1.54 |

EXAMPLE 3

Preparation of agent A: weigh 0.05 portions of dodecyl trimethyl ammonium chloride, 0.10 portions of sodium borate, 0.1 portions of sodium thiosulfate, 0.10 portions of ammonium chloride, 0.15 portions of potassium carbonate, 0.10 portions of sodium metaphosphate, 0.1 portions of magnesium fluoride, 0.15 portions of sodium amino alcohol, and 60 portions of deionized water, etc., mix and stir in a high-speed shearing kettle at 1000-2000 rpm, add 20 portions of sodium silicate solution and 18 portions of potassium silicate solution while continue stirring at high speed until the mixed solution is in completely transparent and uniform liquid state.

Preparation of agent B: weigh 0.13 portions of triethanolamine, 15 portions of sodium hydroxide, 60 portions of deionized water, mix and stir in a high-speed shearing kettle at 1000-2000 rpm, add 30 portions of calcium hydroxide solution while stirring at high speed until the addition is complete and the mixed solution is completely transparent and uniform.

After the waterproof and durable protective repairing material agent A and agent B for the inorganic water-based nano-modified silicate capillary crystalline concrete prepared in this example are applied to the new concrete and used concrete for surface protection, the changes of concrete durability performance before and after application are as follows:

TABLE 3

Comparation of durability parameters of used concrete building before and after the application of agent A and agent B material prepared in Example 3

| Test factors | | Performance before applying agent A and agent B material | Performance after applying agent A and agent B material |
|---|---|---|---|
| Compressive strength | 49 days | 26.8 | 28.9 |
| | 90 days | 35.1 | 38.7 |
| | 180 days | 38.2 | 48.2 |
| Impermeability level | | W6 | W11 |
| Carbonization depth ( 28 d , mm(inch) ) | | 17 (0.67) | 9 (0.35) |
| Resistance depth of chloridion penetration ( C ) | | 2977 | 1997 |
| Antifreeze grade ( After 50 times of freeze- thaw cycle ) | Relative dynamic modulus ( % ) | 47 | 69 |
| | Mass loss rate ( % ) | 5.15 | 0.33 |
| Antifreeze grade ( After 75 times of freeze-thaw cycle ) | Relative dynamic modulus ( % ) | 32 | 58 |
| | Mass loss rate ( % ) | 6.51 | 2.03 |

Concrete itself is a porous and multi-phase material, and certain capillary pores or micro-cracks will be inevitably produced during concrete pouring, concrete hardening process and later operation of the project. The active nano particles of the present invention can penetrate into the deep interior of the concrete after spraying (the material of the present invention can penetrate 40 mm-70 mm (1.57 inch-2.76 inch), while the prior technique can only penetrate a few millimeters) to fully fill these pores or micro-cracks, thereby change the concrete structure substantially.

Finally, it should be noted that: the aforementioned examples are only used to illustrate the technical solutions of the present invention, not to limit them; although the present invention has been described in detail with reference to the above-mentioned embodiments, those ordinary skilled person in the art should understand that they can still modify the technical solutions described in the above-mentioned embodiments, or equivalently replace some or all of the technical features; and these modifications or substitutions do not make the essence of the corresponding technical solutions deviate from the scope of the technical solutions of the embodiments of the present invention.

The invention claimed is:

1. A durability protection method for concrete, characterized as including following steps:
   a first step, rinsing a concrete surface;
   a second step, spraying agent A material or alternately spraying agent B material and agent A material on the rinsed concrete surface;
   said agent A material consisting of by weight: 5-30 portions of sodium silicate, 5-20 portions of potassium silicate, 0.05-0.5 portions of surfactant, 0.1-1 portions of reaction retarder, 0.1-0.5 portions of reductant, 0.1-2 portions of reaction accelerator, 0.01-0.5 portions of anti-freezing auxiliary, 0.1-1 portions of metal ion blocking auxiliary, 0.1-1 portions of surface enhancer, 0.1-0.5 portions of antirusting agent, and 40-70 portions of deionized water; wherein,
   said surfactant of agent A material is dodecyl trimethyl ammonium chloride, and said agent A material is obtained by mixing said surfactant, reaction retarder, reductant, reaction accelerator, anti-freezing auxiliary, metal ion blocking auxiliary, surface enhancer, antirusting agent, and deionized water, stiring them in a high-speed shearing kettle at 1000-2000 rpm, and adding sodium silicate solution and potassium silicate solution while stirring at high speed until the addition is complete and the mixed solution is in a completely transparent and uniform liquid state, said agent B material consisting of by weight: 5-30 portions of calcium hydroxide, 0.05-1 portions of surfactant, 5-30 portions of sodium hydroxide, and 40-80 portions of deionized water.

2. According to the concrete durability protection method in claim 1, it characterized that: said spraying in the second step includes: step one, spraying the agent A material; step two, spraying the agent A material a second time after said agent A material in the step one is dried.

3. According to the concrete durability protection method in claim 1, it characterized that: said spraying in the second step includes: step one, spraying the agent B material; step two, spraying the agent A material after said agent B material in the step one is dried on the concrete surface; step three, repeating step one and step two.

4. According to the concrete durability protection method in claim 1, it characterized that: said reaction retarder of agent A material is any of borate, sodium hydroxide or potassium hydroxide.

5. According to the concrete durability protection method in claim 1, it characterized that: said reductant of agent A material is thionuric acid or sodium thiosulfate inorganic ion reductant.

6. According to the concrete durability protection method in claim 1, it characterized that: said reaction accelerator of agent A material is any kind of inorganic halide salts ionic liquid or citrate ions.

7. According to the concrete durability protection method in claim 1, it characterized that: said anti-freezing auxiliary of agent A material is carbonates.

8. According to the concrete durability protection method mentioned in claim 1, it characterized that: said metal ion blocking auxiliary of agent A material is sodium metaphosphate.

9. According to the concrete durability protection method mentioned in claim 1, it characterized that: said surface enhancer of the agent A material is magnesium fluoride or magnesium chloride.

10. According to the concrete durability protection method mentioned in claim 1, it characterized that: said antirusting agent of agent A material is diamino silver complex or alkamine alkali metal.

11. According to the concrete durability protection method mentioned in claim 1, it characterized that: said surfactant of agent B material is triethanolamine.

* * * * *